United States Patent
Park et al.

(10) Patent No.: US 8,933,667 B2
(45) Date of Patent: Jan. 13, 2015

(54) APPARATUS AND METHOD FOR CONTROLLING CONNECTION OF BATTERY PACKS

(75) Inventors: Jong-Min Park, Daejeon (KR); Woo-Jung Kim, Daejeon (KR); Eung-Yong Kim, Chungbuk (KR)

(73) Assignee: LG Chem, Ltd., Seoul (KR)

( * ) Notice: Subject to any disclaimer, the term of this patent is extended or adjusted under 35 U.S.C. 154(b) by 396 days.

(21) Appl. No.: 13/533,481

(22) Filed: Jun. 26, 2012

(65) Prior Publication Data

US 2012/0268070 A1  Oct. 25, 2012

Related U.S. Application Data

(63) Continuation of application No. PCT/KR2011/009531, filed on Dec. 12, 2011.

(30) Foreign Application Priority Data

Mar. 21, 2011 (KR) ........................ 10-2011-0024925

(51) Int. Cl.
*H02J 7/00* (2006.01)
*H01M 10/44* (2006.01)
*H01M 10/46* (2006.01)
*H01M 10/48* (2006.01)

(52) U.S. Cl.
CPC ........... *H01M 10/441* (2013.01); *H02J 7/0019* (2013.01); *H01M 10/46* (2013.01); *H01M 10/482* (2013.01); *Y02T 10/7055* (2013.01)
USPC ............................ 320/126; 320/117; 320/132

(58) Field of Classification Search
CPC .................................................... H02J 7/0024
USPC ....................................................... 320/126
See application file for complete search history.

(56) References Cited

U.S. PATENT DOCUMENTS

| 6,091,228 | A | 7/2000 | Chady et al. |
| 7,282,891 | B2 | 10/2007 | Smallwood et al. |
| 2011/0025258 | A1* | 2/2011 | Kim et al. ................. 320/106 |
| 2011/0074354 | A1* | 3/2011 | Yano ....................... 320/116 |
| 2011/0127964 | A1* | 6/2011 | Nishida et al. ............ 320/118 |

FOREIGN PATENT DOCUMENTS

| KR | 10-1996-0019895 A | 6/1996 |
| KR | 10-1997-0004218 A | 1/1997 |
| KR | 10-1999-0083526 A | 11/1999 |
| KR | 10-2005-0098235 A | 10/2005 |
| KR | 10-2008-0054077 A | 6/2008 |
| KR | 10-2008-0085331 A | 9/2008 |

* cited by examiner

*Primary Examiner* — Edward Tso
*Assistant Examiner* — Johali Torres Ruiz
(74) *Attorney, Agent, or Firm* — Birch, Stewart, Kolasch & Birch, LLP

(57) ABSTRACT

Disclosed is an apparatus for controlling the connection of a plurality of battery packs including a switching unit provided on a charge/discharge path of each battery pack to selectively open and close the charge/discharge path, a first control unit provided for each battery pack to determine the state of charge (SOC) of each battery pack and control the opening/closing of the switching unit, and a second control unit to receive the determined SOC of each battery pack from the first control unit, group battery packs having a predetermined range of SOCs, select a group containing a largest number of battery packs, connect the battery packs of the selected group in parallel, charge or discharge the parallel-connected battery packs so that a difference in SOC between the parallel-connected battery packs and the non-connected battery pack falls within a predetermined range, and connect the non-connected battery pack thereto in parallel.

16 Claims, 8 Drawing Sheets

APPARATUS AND METHOD FOR CONTROLLING CONNECTION OF BATTERY PACKS

CROSS-REFERENCE TO RELATED APPLICATION

This application is a continuation of International Application PCT/KR2011/009531 filed on Dec. 12, 2011, which claims priority from Korean Patent Application No. 10-2011-0024925, filed on Mar. 21, 2011, the entire disclosure of which is incorporated herein by reference for all purposes.

BACKGROUND

1. Field

The present invention relates to a battery pack management technology, and more particularly, to an apparatus and method for controlling the connection of a plurality of battery packs when connecting the battery packs in parallel.

2. Description of Related Art

Recently, with the active development of storage batteries, robots, satellites, and the like, along with the dramatically increasing demand for portable electronic products such as laptop computers, video cameras, mobile phones, and the like, research and development for high-performance secondary batteries capable of repeatedly charging and discharging has been actively made.

Currently, nickel-cadmium batteries, nickel-metal hydride batteries, nickel-zinc batteries, lithium secondary batteries, and the like are used as commercial secondary batteries. Among them, lithium secondary batteries have little to no memory effect in comparison with nickel-based secondary batteries, and thus lithium secondary batteries are gaining a lot of attention for their advantages of free charging/discharging, low self-discharging, and high energy density.

Meanwhile, with the steady exhaustion of carbon energy and increasing interest in the environment, the demand for hybrid vehicles and electric vehicles is gradually increasing all over the world including United States, Europe, Japan, and the Republic of Korea. Hybrid vehicles and electric vehicles are supplied with power for driving the vehicles from the charging/discharging energy of battery packs. Therefore, in comparison with vehicles powered by an engine alone, they have higher fuel efficiency and can eliminate or lessen the emission of pollutants, which adds to the appeal of hybrid vehicles and electric vehicles. Accordingly, research and development for vehicle batteries essential to hybrid vehicles and electric vehicles have intensified with gaining interest.

Today, one of the technologies gaining attention is an energy storage technology such as smart grid systems. The smart grid system is an intelligent power distribution system that aims to improve the power utilization efficiency through the interaction between power supply and consumption by applying the information and communication technology to the production, delivery, and consumption of energy. To implement such a smart grid system, one of the important elements is a battery pack configured to store power.

Similarly, batteries are being applied in various fields, particularly in the field of hybrid vehicles, electric vehicles, and smart grid systems recent trend, which requires batteries to have high capacity. To improve the capacity of a battery pack, consideration may be taken to increase the size of a respective battery pack. However, in this case, there are physical limitations in expanding the size of a battery pack and inconvenience in managing a battery system. Thus, it is common to connect a plurality of battery packs in parallel to construct a high-capacity battery system.

However, when a plurality of battery packs having different states of charge (SOCs) are connected in parallel, electric sparks may occur. In particular, in the case of widely used lithium secondary batteries, since they have a higher discharging current than other batteries, when battery packs having different SOCs are connected in parallel, battery cells or circuits included in the battery packs may be injured or damaged. Moreover, the occurrence of electric sparks may cause harm or damage to the safety of a user or installer connecting the battery packs.

Further, after connecting a plurality of battery packs in parallel, one or more battery packs may be additionally connected to improve the storage capacity or may replace a certain damaged battery pack. In this case, when the additional battery pack to be connected has different SOC from those of the battery packs already connected in parallel, electric sparks may occur, causing injure or damage to battery cells or circuits included in the battery packs as well as the safety of a user.

DISCLOSURE

The present invention is designed to solve the conventional problems above, and therefore it is an object of the present invention to provide an apparatus and method for controlling the connection of a plurality of battery packs when connecting the battery packs in parallel or connecting an additional battery pack to parallel-connected batteries in parallel, to prevent injury or damage to the battery packs or the safety of a user and establish a stable connection between the battery packs.

Additional features of the invention will be set forth in the description which follows, and in part will be apparent from the description, or may be learned by practice of the invention.

In order to achieve this object, an apparatus for controlling the connection of a plurality of battery packs according to the present invention may include a switching unit provided on a charge/discharge path of each battery pack to selectively open and close the charge/discharge path, a first control unit provided for each battery pack to determine the state of charge (SOC) of each battery pack and control the opening/closing of the switching unit, and a second control unit to receive the determined SOC of each battery pack from the first control unit, group battery packs having a predetermined range of SOCs, select a group containing a largest number of battery packs, connect the battery packs of the selected group in parallel, charge or discharge the parallel-connected battery packs so that a difference in SOC between the parallel-connected battery packs and the non-connected battery pack falls within a predetermined range, and connect the non-connected battery pack to the parallel-connected battery packs in parallel.

Preferably, the first control unit may be implemented as a battery management system (BMS) of each battery pack.

In another aspect, an apparatus for controlling the connection of a plurality of battery packs in connecting an additional battery pack to at least two parallel-connected battery packs may include a switching unit provided on a charge/discharge path of each battery pack to selectively open and close the charge/discharge path, a first control unit provided for each battery pack to determine the SOC of each battery pack and control the opening/closing of the switching unit, and a second control unit to receive the determined SOC of each battery pack from the first control unit, when a difference in SOC between the parallel-connected battery packs and the additional battery pack is out of a predetermined range, charge or discharge the parallel-connected battery packs so that the difference in SOC falls within the predetermined range, and connect the additional battery pack to the parallel-connected battery packs in parallel.

Preferably, the first control unit may be implemented as a BMS of each battery pack.

Also, the battery pack according to the present invention may include the above apparatus.

In another aspect, a method for controlling the connection of a plurality of battery packs may include determining the SOC of each battery pack, comparing the determined SOCs and grouping battery packs having a predetermined range of SOCs, selecting a group containing a largest number of battery packs and connecting the battery packs of the selected group in parallel, charging or discharging the parallel-connected battery packs so that a difference in SOC between the parallel-connected battery packs and the non-connected battery pack falls within a predetermined range, and connecting the non-connected battery pack to the parallel-connected battery packs in parallel.

Preferably, the SOC of each battery pack may be determined by a BMS of each battery pack.

In another aspect, a method for controlling the connection of a plurality of battery packs in connecting an additional battery pack to at least two parallel-connected battery packs may include determining the SOC of each battery pack, comparing the determined SOCs, when a difference in SOC between the parallel-connected battery packs and the additional battery pack is within a predetermined range, charging or discharging the parallel-connected battery packs so that the difference in SOC falls within a predetermined range, and connecting the additional battery pack to the parallel-connected battery packs in parallel.

Preferably, the SOC of each battery pack may be determined by a BMS of each battery pack.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure is not to be construed as being limited to the drawings.

DETAILED DESCRIPTION

The present invention will now be described in detail with reference to the accompanying drawings. Prior to description, it should be understood that terms and words used in the specification and the appended claims should not be construed as having common and dictionary meanings, but should be interpreted as having meanings and concepts corresponding to technical ideas of the present invention in view of the principle that the inventor can properly define the concepts of the terms and words in order to describe his/her own invention as best as possible.

Accordingly, the description proposed herein is just a preferable example for the purpose of illustrations only, not intended to limit the scope of the invention, so it will be apparent to those skilled in the art that various modifications and variation can be made in the present invention without departing from the spirit or scope of the invention.

Figure 1:
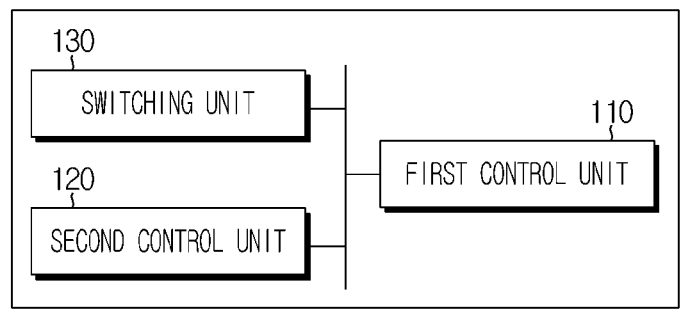
FIG. 1 is a schematic block diagram illustrating a functional structure of an apparatus for controlling the connection of a plurality of battery packs according to a preferred embodiment of the present invention.
Figure 2:
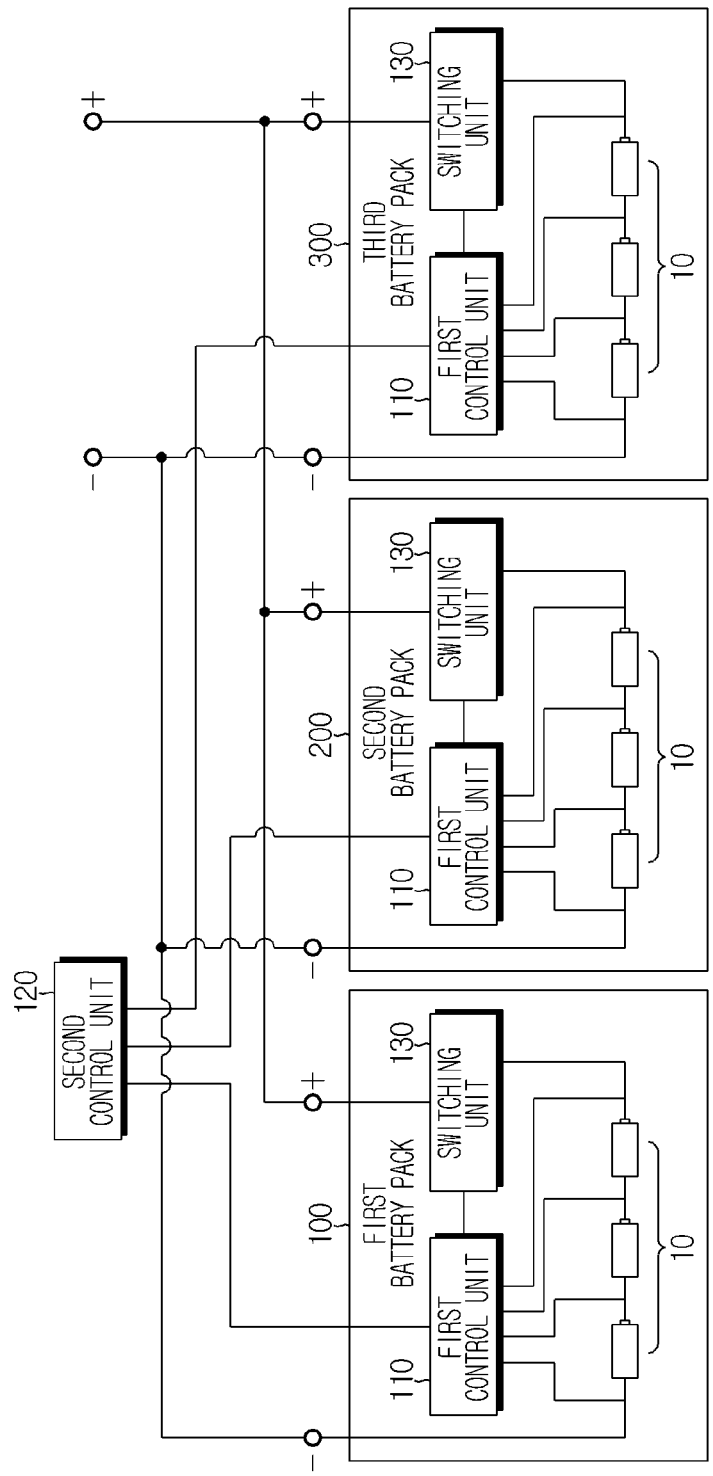
FIG. 2 is a schematic circuit diagram illustrating an example of an apparatus for controlling the connection of three battery packs according to a preferred embodiment of the present invention.

FIG. 1 is a schematic block diagram illustrating a functional structure of an apparatus for controlling the connection of a plurality of battery packs according to a preferred embodiment of the present invention. FIG. 2 is a schematic circuit diagram illustrating an example of an apparatus for controlling the connection of three battery packs according to a preferred embodiment of the present invention.

Referring to FIGS. 1 and 2, an apparatus for controlling the connection of a plurality of battery packs according to a preferred embodiment of the present invention includes a switching unit 130, a first control unit 110, and a second control unit 120.

The switching unit 130 is provided on a charge/discharge path of each battery pack to selectively open and close the charge/discharge path. That is to say, when the switching unit 130 of each battery pack is turned on, the input/output of an electric current for the corresponding battery pack is allowed, and when the switching unit 130 is turned off, the input/output of an electric current for the corresponding battery pack is not allowed.

Referring to the embodiment of FIG. 2, the switching unit 130 is included in each of first, second, and third battery packs 100, 200, and 300 to selectively open and close a charge/discharge path of each battery pack.

The switching unit 130 may be generally included in a battery pack protection apparatus. For example, the switching unit 130 may be a charging/discharging switch provided on a charge/discharge path of a battery pack.

Preferably, the switching unit 130 may be implemented as a field effect transistor (FET), a relay, or an insulated gate bipolar transistor (IGBT). However, the present invention is not limited in this regard, and a variety of mechanisms for opening/closing an electrical path disclosed at the time of filing the present invention may be employed as the switching unit 130 of the present invention.

The first control unit 110 is provided for each battery pack to determine the state of charge (SOC) of each battery pack. As shown in FIG. 2, at least one battery cell 10 is included in one battery pack, and the first control unit 110 determines the SOC of the battery cell 10 included in each battery pack. The first control unit 110 may use a variety of methods for determining the SOC of each battery pack, and as a representative example, a current integration method may be mentioned. The current integration method determines the SOC of a battery by integrating the input/output current of the battery and correcting the result based on an initial capacity. The present invention is not limited to a specific method for determining the SOC, and the first control unit 110 may determine the SOC using various methods. The SOC determining scheme of the first control unit 110 is well known to a person having ordinary skill in the art, and thus the detailed description is herein omitted.

Also, the first control unit 110 may control the opening/closing of the switching unit 130. That is, the first control unit 110 may be connected to the switching unit 130 provided on a charge/discharge path of the corresponding battery pack to receive and transmit an electrical signal from/to the switching unit 130 and thereby turn on/off the switching unit 130.

Referring to the embodiment of FIG. 2, the first control unit 110 is included in each of the first, second, and third battery packs 100, 200, and 300 to determine the SOC of the battery cell 10 included in each of the first, second and third battery packs 100, 200 and 300, and is connected to the switching unit 130 included in each of the first, second and third battery packs 100, 200 and 300 to control the opening/closing of the switching unit 130.

Preferably, the first control unit 110 may be implemented as a battery management system (BMS). Here, the BMS generally controls the charging/discharging of the battery pack, and is typically included in a battery pack protection apparatus. However, the first control unit 110 of the present invention is not limited to a specific example described above, and may be implemented as various types of components or elements. Also, the first control unit 110 may be implemented as a separate device that is not included in the battery pack.

The second control unit 120 is electrically connected to the first control unit 110 to receive and transmit an electrical signal from/to the first control unit 110. In particular, the second control unit 120 receives the determined SOC of each battery pack requested for parallel connection from the first control unit 110 of the corresponding battery pack. Then, the second control unit 120 compares the determined SOC of each battery pack to be connected in parallel.

In this instance, when there is no battery pack connected in parallel, that is, when a plurality of battery packs are to be initially connected in parallel, the second control unit 120 groups battery packs having a predetermined range of SOCs. Here, the predetermined range is referred to a difference in SOC between battery packs to be connected in parallel so as not to cause electric sparks or damage to the battery packs, and may be set variably depending on conditions, for example, the type, capacity, or characteristics of the battery packs.

For example, assume that the first, second and third battery packs 100, 200 and 300 having SOCs of 69%, 71%, and 78%, respectively, are to be connected in parallel as shown in FIG. 2. The second control unit 120 may group battery packs having a predetermined range of SOCs, for example, SOCs having a difference of 3% or less therebetween. In this instance, the second control unit 120 may group the first battery pack 110 and the second battery pack 200 having 2% difference in SOC as a first group, and classify the third battery pack 300 as a second group. However, the present invention is not limited to a specific grouping scheme described above, and a plurality of battery packs may be grouped in various ways. For example, in this embodiment, the first battery pack 100 having the SOC falling within the range of 61 to 70% may be classified as a group, and the second battery pack 200 and the third battery pack 300 having the SOCs falling within the range of 71 to 80% may be grouped as another group.

Also, the second control unit 120 may group battery packs having the same SOC. However, since battery packs having substantially the same SOC are not common, it is preferable to group battery packs having a predetermined range of SOCs as described above.

After the grouping of a plurality of battery packs is completed, the second control unit 120 selects a group containing a largest number of battery packs and connects the battery packs of the selected group in parallel.

For example, when the first battery pack 100 and the second battery pack 200 are grouped as a first group and the third battery pack 300 is classified as a second group as described above, the second control unit 120 selects the first group containing a largest number of battery packs and connects the battery packs included in the selected group, that is, the first battery pack 100 and the second battery pack 200, in parallel.

The parallel connection of the battery packs may be established by the opening/closing of the switching unit 130. For example, the second control unit 120 may transmit a signal to the first control unit 110 of the first battery pack 100 and the first control unit 110 of the second battery pack 200 to turn on the switching unit 130 of each battery pack. Then, the first control unit 110 of the first battery pack 100 turns on the switching unit 130 of the first battery pack 100, and the first control unit 110 of the second battery pack 200 turns on the switching unit 130 of the second battery pack 200. Thus, the first battery pack 100 and the second battery pack 200 are connected in parallel. In this instance, since a difference in SOC between the first battery pack 100 and the second battery pack 200 falls within a predetermined range, the first battery pack 100 and the second battery pack 200 can be stably connected in parallel without electric sparks or damage to the battery packs.

Although this embodiment shows that the second control unit 120 controls the first control unit 110 of each battery pack to open and close the switching unit 130 of each battery pack, the second control unit 120 may be connected to the switching unit 130 of each battery pack to directly control the switching unit 130.

After the battery packs in the selected group are initially connected in parallel, the second control unit 120 charges or discharges the connected battery packs so that a difference in SOC between the connected battery packs and the non-connected battery pack falls within a predetermined range. Here, the predetermined range is referred to a difference in SOC between the parallel-connected battery packs and the additional battery pack so as not to cause electric sparks or damage to the battery packs. This difference in SOC may be equal to or different from the difference in SOC used in grouping the battery packs.

For example, when the third battery pack 300 is to be additionally connected to the first and second battery packs 100 and 200 already connected in parallel as shown in FIG. 2, the second control unit 120 charges or discharges the first and second battery packs 100 and 200 to equalize the SOCs of the first and second battery packs 100 and 200 to the SOC of the third battery pack 300. That is, in this embodiment, since the SOC of the third battery pack 300 is 78%, the SOC of the first battery pack 100 is 69%, and the SOC of the second battery pack 200 is 71%, the second control unit 120 charges the first and second battery packs 100 and 200 to increase the SOCs of the first and second battery packs 100 and 200 to the level of the SOC of the third battery pack 300. When the first, second and third battery packs 100, 200 and 300 have a predetermined range of SOCs, for example, SOCs having a difference of 3% or less therebetween, the second control unit 120 may stop charging the first and second battery packs 100 and 200.

Here, since a charge/discharge path of each battery pack to be charged or discharged is open by the switching unit 130 turning on, once a charger or load is connected to a common input/output terminal of the battery packs connected in parallel, the battery packs may be charged or discharged. For example, in this embodiment, since the first battery pack 100 and the second battery pack 200 are connected in parallel by the switching unit 130 turning on, once a charger is connected to an input/output terminal of the first battery pack 100 and the second battery pack 200, the first battery pack 100 and the second battery pack 200 may be charged.

When a difference in SOC between the parallel-connected battery packs and the non-connected battery pack falls within a predetermined range by the charging or discharging of the parallel-connected battery packs, the second control 120 additionally connects the non-connected battery pack to the parallel-connected battery packs in parallel.

For example, in the embodiment of FIG. 2, when the SOCs of the first battery pack 100 and the second battery pack 200 connected in parallel become similar to the SOC of the third battery pack 300 by the charging of the first battery pack 100 and the second battery pack 200, the second control unit 120 controls the first control unit 110 of the third battery pack 300 to turn on the switching unit 130 of the third battery pack 300. When the switching unit 130 connected to the first control unit 110 of the third battery pack 300 is turned on, a parallel connection is established between the third battery pack 300 and the first and second battery packs 100 and 200.

In this instance, since the third battery pack 300 to be additionally connected has similar SOC to those of the first battery pack 100 and the second battery pack 200 by the charging of the first battery pack 100 and the second battery pack 200, electric sparks or damage do not occur to the battery packs when connecting the battery packs in parallel.

Preferably, after the parallel-connecting of a plurality of target battery packs is completed, the second control unit 120 may charge the entire battery pack connected in parallel.

For example, in the embodiment of FIG. 2, after connecting the first, second and third battery packs 100, 200 and 300 in parallel, the second control unit 120 may connect all the connected first, second and third battery packs 100, 200 and 300 to a charger to charge the first, second, and third battery packs 100, 200, and 300.

Accordingly, a battery system including a plurality of battery packs connected in parallel may be optimized to get ready for immediate application.

FIG. 3 is a view illustrating a process for connecting a plurality of battery packs having different SOCs in parallel by an apparatus for controlling the connection of the battery packs according to an embodiment of the present invention.

Figure 3A:
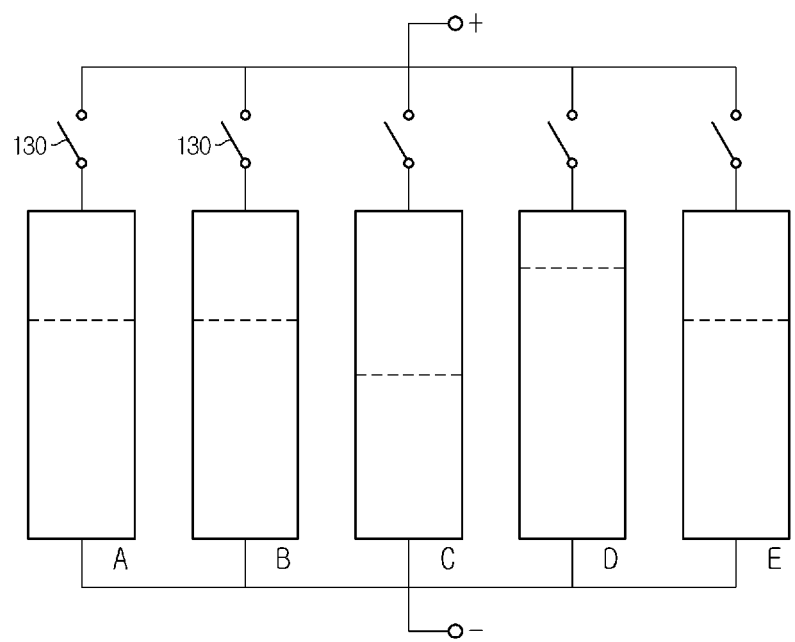
FIG. 3 is a view illustrating a process for connecting a plurality of battery packs having different states of charge (SOCs) in parallel by an apparatus for controlling the connection of the battery packs according to an embodiment of the present invention.

Referring to FIG. 3A, battery packs to be connected in parallel, that is, battery packs requested for parallel connection are five battery packs A, B, C, D, and E. The SOC of each battery pack is indicated in dots. For example, dots at the lower location of the battery pack represent the lower SOC, and dots at the higher location of the battery pack represent the higher SOC. Also, dots at the similar locations of the battery packs represent the similar SOCs. The SOCs of the battery packs A, B, C, D, and E may be determined by the first control unit 110 of each battery pack as described above.

The second control unit 120 receives the determined SOC of each battery pack from the first control unit 110, compares them, and groups battery packs having a predetermined range of SOCs, that is, battery packs having similar SOCs. In FIG. 3, the second control unit 120 may group the battery packs A, B, and E as a group. The other battery packs, that is, battery packs C and D may be grouped as another group. In this instance, since the group containing the battery packs A, B, and E includes a largest number of battery packs, the second control unit 120 selects the battery packs A, B, and E to be initially connected in parallel.

Figure 3B:
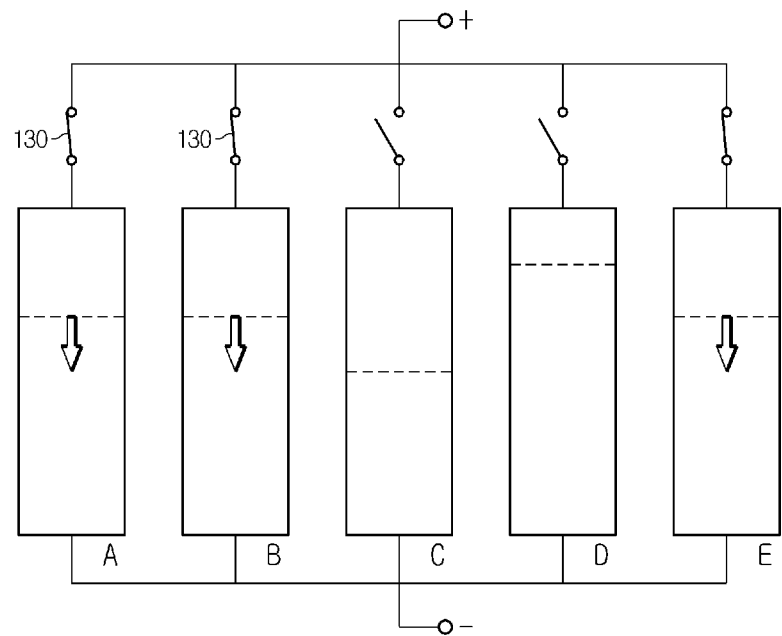
Figure 3C:
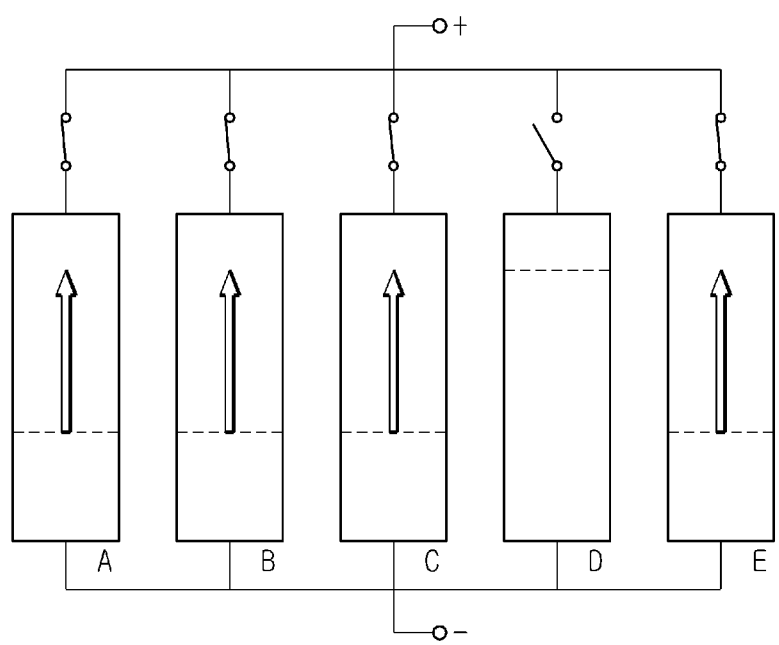

Next, as shown in FIG. 3B, the second control unit 120 connects the selected battery packs A, B, and E in parallel via the switching unit 130 of each battery pack. Then, the second control unit 120 discharges the battery packs A, B, and E to equalize the SOCs of the battery packs A, B, and E to the SOC of the battery pack C, as indicated by the arrow in FIG. 3B.

When a difference in SOC between the battery packs A, B, and E and the battery pack C falls within a predetermined range by the discharging of the battery packs A, B, and E, the second control unit 120 turns on the switching unit 130 of the battery pack C to connect the battery pack C to the battery packs A, B, and E in parallel, as shown in FIG. 3D. Next, the second control unit 120 charges the battery packs A, B, C, and E connected in parallel so that a difference in SOC between the battery packs A, B, C, and E and the non-connected battery pack D falls within a predetermined range, as indicated by the arrow in FIG. 3C.

When a difference in SOC between the battery packs A, B, C, and E and the battery pack D falls within a predetermined range by the charging of the battery packs A, B, C, and E, the second control unit 120 turns on the switching unit 130 of the battery pack D to connect the battery pack D to the battery packs A, B, C, and E in parallel, as shown in FIG. 3D.

Thereby, a plurality of the battery packs A, B, C, D, and E requested for parallel connection are connected in parallel.

Preferably, after the parallel-connecting of a plurality of the battery packs A, B, C, D, and E requested for parallel connection is completed, the second control unit 120 may charge the entire battery pack connected in parallel, as shown in FIG. 3D, so that a battery system including a plurality of the battery packs A, B, C, D, and E connected in parallel is in an optimum state for applications.

Although the embodiment of FIG. 3 shows the connection of the battery pack D prior to the connection of the battery pack C after initially connecting the battery packs A, B, and E in parallel, the present invention is not limited in this regard. It is obvious to a person having ordinary skill in the art that the battery packs C and D may be sequentially connected to the battery packs A, B, and E initially connected in parallel.

Also, although the embodiment of FIG. 3 shows five battery packs connected in parallel, the present invention is not limited to a specific number of battery packs.

According to the above, the apparatus for controlling the connection of a plurality of battery packs according to the present invention may stably connect a plurality of battery packs having different SOCs in parallel without electric sparks or damage to the cells 10 or circuits included in the battery packs, when initially connecting the entire battery pack in parallel to construct a battery system, or after constructing a battery system, connecting the entire battery pack in parallel again.

Also, the apparatus for controlling the connection of a plurality of battery packs according to the present invention may stably connect an additional battery pack to two or more parallel-connected battery packs in parallel.

To connect an additional battery pack to two or more parallel-connected battery packs in parallel, the apparatus for controlling the connection of a plurality of battery packs according to the present invention may include the switching unit 130, the first control unit 110, and the second control unit 120.

As described above, the switching unit 130 is provided on a charge/discharge path of each battery pack to selectively open and close the charge/discharge path. The first control unit 110 is provided for each battery pack to determine the SOC of each battery pack and to control the opening/closing of the switching unit 130.

In particular, the second control unit 120 receives the determined SOC of each battery pack from the first control unit 110, and when a difference in SOC between the parallel-connected battery packs and the additional battery pack to be connected thereto is not within a predetermined range, charges or discharges the parallel-connected battery packs so that the difference in SOC falls within the predetermined range. Next, the second control unit 120 connects the additional battery pack to the parallel-connected battery packs in parallel.

FIG. 4 is a view illustrating a process for connecting an additional battery pack to two or more parallel-connected battery packs by an apparatus for controlling the connection of the battery packs according to another embodiment of the present invention. In FIG. 4, the height of the dots represents the SOC level of each battery pack, like FIG. 3.

Figure 4A:
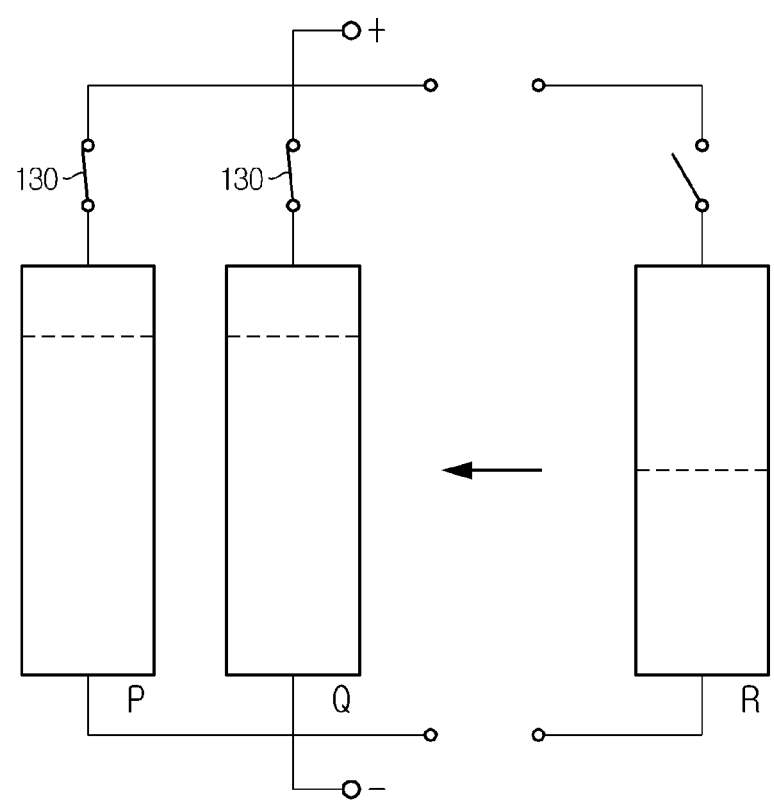
FIG. 4 is a view illustrating a process for connecting an additional battery pack to two or more parallel-connected battery packs by an apparatus for controlling the connection of the battery packs according to another embodiment of the present invention.

Referring to FIG. 4*a*, a battery pack R is to be additionally connected in parallel to parallel-connected battery packs P and Q. In this instance, the second control unit 120 receives the SOCs of the parallel-connected battery packs P and Q and the SOC of the additional battery pack R from the first control unit 110, and compares the received SOCs.

Figure 4B:
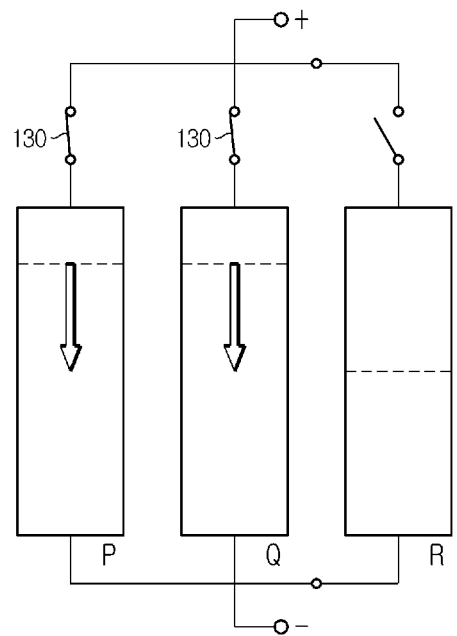

In FIG. 4A, since there is a remarkable difference in SOC between the battery packs P and Q and the battery pack R, the second control unit 120 discharges the battery packs P and Q so that the difference in SOC falls within a predetermined range, as indicated by the arrow in FIG. 4B.

Figure 4C:
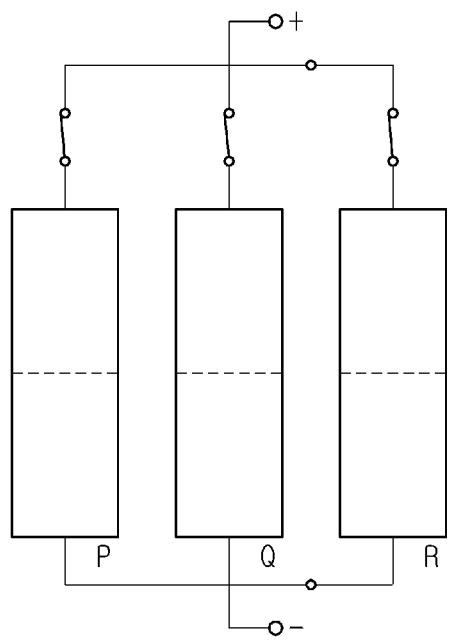

Next, the second control unit 120 turns on the switching unit 130 of the battery pack R to connect the battery pack R to the battery packs P and Q in parallel, as shown in FIG. 4C.

According to this embodiment, a stable connection may be established between an additional battery pack and parallel-connected battery packs having a difference in SOC beyond a predetermined range, thereby achieving the extension of parallel connection without injury or damage to the safety of a user or the battery packs.

Although not shown in FIG. 4C, after the battery pack R is additionally connected, the second control unit 120 may supply the charging power to a common input/output terminal of the battery packs P, Q, and R to charge all the battery packs P, Q, and R.

Also, although the embodiment of FIG. 4 shows one additional battery pack connected to two battery packs, the present invention is not limited to a specific number of battery packs. For example, the present invention may cover three or more battery packs already connected in parallel or two or more battery pack to be additionally connected.

Further, the present invention may be applied to the case where one of the two battery packs is replaced by a new battery pack, other than extension of parallel connection according to the embodiment of FIG. 4. For example, when among the battery packs P and Q already connected in parallel, the battery pack Q is to be replaced by the battery pack R, the apparatus for controlling the connection of a plurality of battery packs according to the present invention may perform the above process. That is, the battery pack Q may be disconnected from the battery pack P, the SOC of the battery pack P may be adjusted to the SOC of the battery pack R, and then the battery pack R may be connected to the battery pack P in parallel. In this case, the second control unit 120 turns off the switching unit 130 of the battery pack Q to separate the battery pack Q from the battery pack P, thereby ensuring the safety of a user.

Alternatively, the apparatus for controlling the connection of a plurality of battery packs according to the present invention may be incorporated in a battery pack. Accordingly, the battery pack of the present invention may include the above embodiments of the apparatus for controlling the connection of a plurality of battery packs. In particular, the first control unit 110 and/or the second control unit 120 may be implemented as a BMS of a battery pack.

Figure 5:
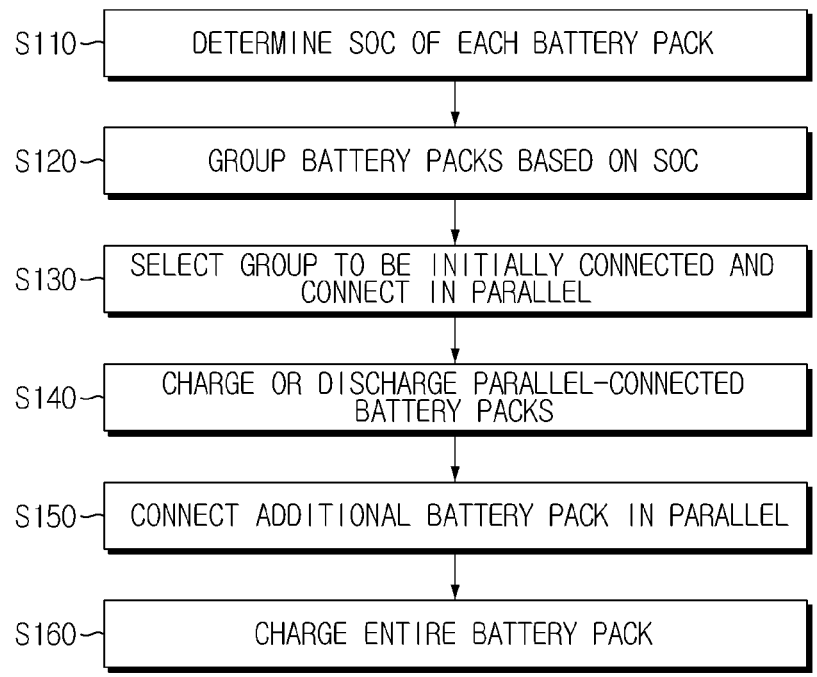
FIG. 5 is a schematic flow chart illustrating a method for controlling the connection of a plurality of battery packs according to an embodiment of the present invention.

FIG. 5 is a schematic flow chart illustrating a method for controlling the connection of a plurality of battery packs according to an embodiment of the present invention.

Referring to FIG. 5, to control the connection of a plurality of battery packs according to the present invention, the first control unit 110 determines the SOCs of the battery packs to be connected in parallel (S110). Here, the SOC may be determined by a BMS of each battery pack. Next, the second control unit 120 compares the determined SOCs and groups battery packs having a predetermined range of SOCs (S120). Next, the second control unit 120 selects a group containing a largest number of battery packs to be initially connected in parallel and connects the battery packs in the selected group in parallel (S130). Next, the second control unit 120 charges or discharges the parallel-connected battery packs so that a difference in SOC between the parallel-connected battery packs and the non-battery battery pack falls within a predetermined range (S140). Next, the second control unit 120 additionally connects the non-battery battery pack to the parallel-connected battery packs in parallel (S150).

After S150, the second control unit 120 may preferably charge the entire battery pack connected in parallel (S160).

In S130 and S150, the connecting of the battery packs may be implemented by a FET, a relay, or an IGBT of each battery pack.

Figure 6:
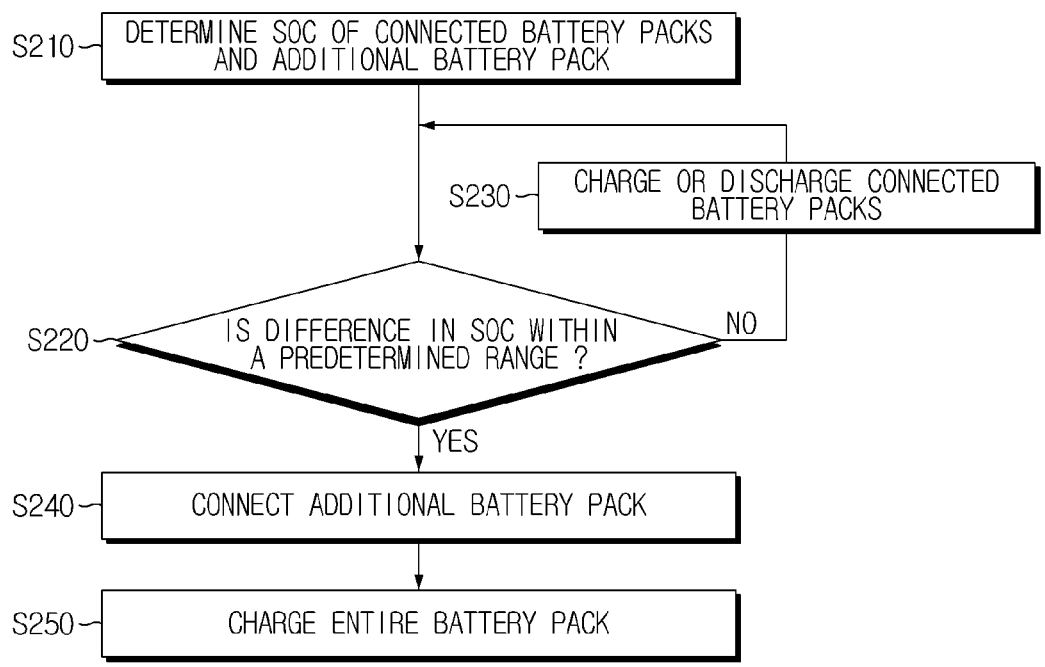
FIG. 6 is a schematic flow chart illustrating a method for controlling the connection of a plurality of battery packs according to another embodiment of the present invention.

FIG. 6 is a schematic flow chart illustrating a method for controlling the connection of a plurality of battery packs according to another embodiment of the present invention.

Referring to FIG. 6, to connect an additional battery pack to two or more parallel-connected battery packs, the first control unit 110 determines the SOCs of the parallel-connected battery packs and the SOC of the additional battery pack (S210). Here, the SOC may be determined by a BMS of each battery pack. Next, the second control unit 120 compares the SOCs of the parallel-connected battery packs with the SOC of the additional battery pack (S220). When a difference in SOC between the parallel-connected battery packs and the additional battery pack is not within a predetermined range, the second control unit 120 charges or discharges the parallel-connected battery packs so that the difference in SOC falls within the predetermined range (S230). When the difference in SOC falls within the predetermined range, the second control unit 120 connects the additional battery pack to the parallel-connected battery packs in parallel (S240).

After S240, the second control unit 120 may preferably charge the entire battery pack connected in parallel (S250).

In S240, the connecting of the battery packs may be implemented by a FET, a relay or an IGBT of each battery pack.

According to teachings above, a plurality of battery packs having different SOCs may be connected in parallel to achieve the high capacity without injury or damage to the safety of a user or cells or circuits included in the battery packs.

Accordingly, a high-capacity battery system may be stably constructed from a plurality of battery packs connected in parallel.

Also, an additional battery pack may be connected in parallel to a plurality of parallel-connected battery packs to manage and maintain a battery system and change the capacity without injury or damage to the safety of a user or the battery packs.

In particular, a high-capacity battery system may be stably constructed from high-performance and high-efficiency batteries such as lithium secondary batteries, and the battery system may be readily managed and maintained and may easily increase or reduce in capacity. Accordingly, lithium secondary batteries may replace battery packs of a conventional energy storage system including lead storage batteries.

Further, it is possible to easily mass-produce battery packs for parallel configuration via a standard interface between a designer of the battery system and a provider of the battery packs.

It will be apparent to a person having ordinary skill in the art that the term 'unit' described herein is merely used to indicate or define the logic elements or components and does not necessarily indicate or define physically separable elements or components.

Although the present invention has been described hereinabove, it should be understood that the detailed description and specific examples, while indicating preferred embodiments of the invention, are given by way of illustration only, since various changes and modifications within the spirit and scope of the invention will become apparent to those skilled in the art from this detailed description.

What is claimed is:

1. An apparatus for controlling the connection of a plurality of battery packs, the apparatus comprising:
   a switching unit provided on a charge/discharge path of each battery pack to selectively open and close the charge/discharge path;
   a first control unit provided for each battery pack to determine the state of charge (SOC) of each battery pack and control the opening/closing of the switching unit; and
   a second control unit to receive the determined SOC value of each battery pack from the first control unit, group battery packs having SOC values within a predetermined error range, select a group containing a largest number of battery packs, connect the battery packs of the selected group in parallel, charge or discharge the parallel-connected battery packs so that a difference in SOC between the parallel-connected battery packs and a non-connected battery pack falls within a predetermined range, and additionally connect the non-connected battery pack in parallel.

2. The apparatus according to claim 1,
   wherein the second control unit charges the entire battery pack connected in parallel after connecting the plurality of battery packs.

3. The apparatus according to claim 1,
   wherein the first control unit is implemented as a battery management system (BMS) of each battery pack.

4. The apparatus according to claim 1,
   wherein the switching unit is implemented as a field effect transistor (FET), a relay, or an insulated gate bipolar transistor (IGBT).

5. An apparatus for controlling the connection of battery packs that controls connection of an additional battery pack to at least two parallel-connected battery packs, the apparatus comprising:
   a switching unit provided on a charge/discharge path of each battery pack to selectively open and close the charge/discharge path;
   a first control unit provided for each battery pack to determine a state of charge (SOC) of each battery pack and control the opening/closing of the switching unit; and
   a second control unit to receive the determined SOC value of each battery pack from the first control unit, compare the SOCs of the parallel-connected battery packs and the additional battery pack, when a difference in SOC between the parallel-connected battery packs and the additional battery pack is out of a predetermined range, charge or discharge the parallel-connected battery packs so that the difference in SOC between the parallel-connected battery packs and the additional battery pack falls within the predetermined range, and connect the additional battery pack in parallel.

6. The apparatus according to claim 5,
   wherein the second control unit charges the entire battery pack connected in parallel after connecting the additional battery pack in parallel.

7. The apparatus according to claim 5,
   wherein the first control unit is implemented as a battery management system (BMS) of each battery pack.

8. The apparatus according to claim 5,
   wherein the switching unit is implemented as a field effect transistor (FET), a relay, or an insulated gate bipolar transistor (IGBT).

9. A method for controlling the connection of a plurality of battery packs, the method comprising:
   determining the state of charge (SOC) of each battery pack;
   comparing the determined SOC values and grouping battery packs having SOC values within a predetermined error range;
   selecting a group containing a largest number of battery packs and connecting the battery packs of the selected group in parallel;
   charging or discharging the parallel-connected battery packs so that a difference in SOC between the parallel-connected battery packs and a non-connected battery pack falls within a predetermined range; and
   additionally connecting the non-connected battery pack in parallel.

10. The method according to claim 9, further comprising:
    charging the entire battery pack connected in parallel after additionally connecting the battery pack in parallel.

11. The method according to claim 9,
    wherein the SOC of each battery pack is determined by a battery management system (BMS) of each battery pack.

12. The method according to claim 9,
    wherein the battery packs are connected or disconnected by a field effect transistor (FET), a relay or an insulated gate bipolar transistor (IGBT) of each battery pack.

13. A method for controlling the connection of a plurality of battery packs that controls connection of an additional battery pack to at least two parallel-connected battery packs, the method comprising:
    determining the state of charge (SOC) of each of the parallel-connected battery packs and the additional battery pack;
    comparing the SOCs of the parallel-connected battery packs and the additional battery pack;
    when a difference in SOC between the parallel-connected battery packs and the additional battery pack falls out of a predetermined range, charging or discharging the parallel-connected battery packs so that the difference in SOC between the parallel-connected battery packs and the additional battery pack falls within the predetermined range; and connecting the additional battery pack.

14. The method according to claim 13, further comprising:

charging the entire battery pack connected in parallel after connecting the additional battery pack in parallel.

15. The method according to claim 13, wherein the SOC of each battery pack is determined by a battery management system (BMS) provided in each battery pack.

16. The method according to claim 13, wherein the battery packs are connected or disconnected by a field effect transistor (FET), a relay or an insulated gate bipolar transistor (IGBT) provided in each battery pack.

* * * * *